US009216754B2

(12) United States Patent
Chen

(10) Patent No.: US 9,216,754 B2
(45) Date of Patent: Dec. 22, 2015

(54) WHEEL BRAKE SET FOR LUGGAGE CASE

(71) Applicant: Sinox Lock (Kunshan) Co., Ltd., Kunshan Xiangsu Province (CN)

(72) Inventor: Mao-Yi Chen, New Taipei (TW)

(73) Assignee: Sinox Lock (Kunshan) Co. Ltd., Kunshan (CN)

( * ) Notice: Subject to any disclaimer, the term of this patent is extended or adjusted under 35 U.S.C. 154(b) by 0 days.

(21) Appl. No.: 14/155,161

(22) Filed: Jan. 14, 2014

(65) Prior Publication Data

US 2014/0216862 A1     Aug. 7, 2014

Related U.S. Application Data

(60) Provisional application No. 61/759,600, filed on Feb. 1, 2013.

(51) Int. Cl.
*B62B 5/04* (2006.01)
*B60B 33/00* (2006.01)

(52) U.S. Cl.
CPC .............. *B62B 5/0447* (2013.01); *B60B 33/00* (2013.01); *B60B 33/0086* (2013.01); *B60B 33/0092* (2013.01); *B62B 5/0461* (2013.01); *B60B 2200/45* (2013.01); *B60B 2900/331* (2013.01)

(58) Field of Classification Search
CPC .... B62B 5/0447; B62B 5/0461; B62B 9/087; B60B 2200/45

USPC ....................................................... 188/19, 31
See application file for complete search history.

(56) References Cited

U.S. PATENT DOCUMENTS

| 2,879,865 | A | * | 3/1959 | Simmons ........................ 188/69 |
| 2,988,175 | A | * | 6/1961 | West ............................... 188/31 |
| 4,084,663 | A | * | 4/1978 | Haley .............................. 188/31 |
| 5,343,988 | A | * | 9/1994 | Bartsch et al. .............. 190/18 A |
| 7,175,002 | B2 | * | 2/2007 | Chiang ........................ 188/1.12 |
| 2012/0311821 | A1 | | 12/2012 | Eguchi |

FOREIGN PATENT DOCUMENTS

| TW | I329501 | 10/2009 |
| TW | M408272 | 8/2011 |
| TW | M427046 | 1/2012 |
| WO | WO 2009021146 | 2/2009 |

* cited by examiner

*Primary Examiner* — Xuan Lan Nguyen
(74) *Attorney, Agent, or Firm* — Schmeiser, Olsen & Watts LLP

(57) ABSTRACT

A wheel brake set for a luggage case contains a covering member; a support assembly for supporting the covering member; at least one wheel mounted on one side of the support assembly, and a respective one of the at least one wheel having a plurality of hollowly concave portions defined on one side thereof; a driving assembly including a fixing pin secured on the support assembly for positioning a respective one wheel at an original position. The fixing pin is driven to extend out of the support assembly and to insert into a pushing position of one of the plurality of hollowly concave portions, thus positioning the respective one wheel.

16 Claims, 8 Drawing Sheets

WHEEL BRAKE SET FOR LUGGAGE CASE

FIELD OF THE INVENTION

The present invention relates to a wheel brake set for a luggage case which is mounted on a bottom end of the luggage case and is capable of braking at least one wheel to position the luggage case.

BACKGROUND OF THE INVENTION

A conventional luggage case is positioned by using a wheel brake set. US 2012/0311821, TW M408272, and TW M427046 disclose a brake pin or a braking block for braking at least one wheel of the luggage case. However, the brake pin and the braking block are rubbed and broken after a long period of using time.

In addition, WO 2009/021146 and TW 1329501 disclose a wheel braking structure is designed in a gear braking type or in a gear slot type, wherein a stop device or a pin is served to retain a gear or a gear slot, thereby braking at least one wheel. Nevertheless, the stop device or the pin are rubbed and broken after a long period of using time.

The present invention has arisen to mitigate and/or obviate the afore-described disadvantages.

SUMMARY OF THE INVENTION

The primary object of the present invention is to provide a wheel brake set for a luggage case which is mounted on a bottom end of the luggage case and is capable of braking at least one wheel to position the luggage case securely after a long period of using time.

To obtain the above objective, a wheel brake set for a luggage case provided by the present invention contains: a covering member; a support assembly for supporting the covering member; at least one wheel mounted on one side of the support assembly, and a respective one of the at least one wheel having a plurality of hollowly concave portions defined on one side thereof; a driving assembly including a fixing pin secured on the support assembly for positioning a respective one wheel at an original position. The fixing pin is driven to extend out of the support assembly and to insert into a pushing position of one of the plurality of hollowly concave portions, thus positioning the respective one wheel.

Preferably, the covering member includes an upper cover and a lower cover, wherein the upper cover has a through pore defined thereon so that a pulling rope is inserted through the through pore to couple with the driving assembly.

Preferably, the driving assembly includes: an actuation plate disposed in the covering member, the actuation plate has a first extending portion and a second extending portion which are in connection with the pulling rope; a hollow tube inserted through the lower cover and the support assembly; a push bolt inserted through a hollow tube and having one end for abutting against the second extending portion; a sliding post having a first end for abutting against the push bolt and a second end for contacting with the fixing pin; and a resilient element for pushing the fixing pin to keep at the original position.

Preferably, the sliding post has a first tilted guiding face formed thereon, and the fixing pin has a second tilted guiding face thereon and abutting against the first tilted guising face.

Preferably, the sliding post, the fixing pin, and the resilient element are accommodated in the frame.

Preferably, the respective one wheel includes the plurality of hollowly concave portions defined on the side surface thereof, and between any two adjacent spokes is defined one of the plurality of hollowly concave portions.

DETAILED DESCRIPTION OF THE PREFERRED EMBODIMENTS

Figure 1:
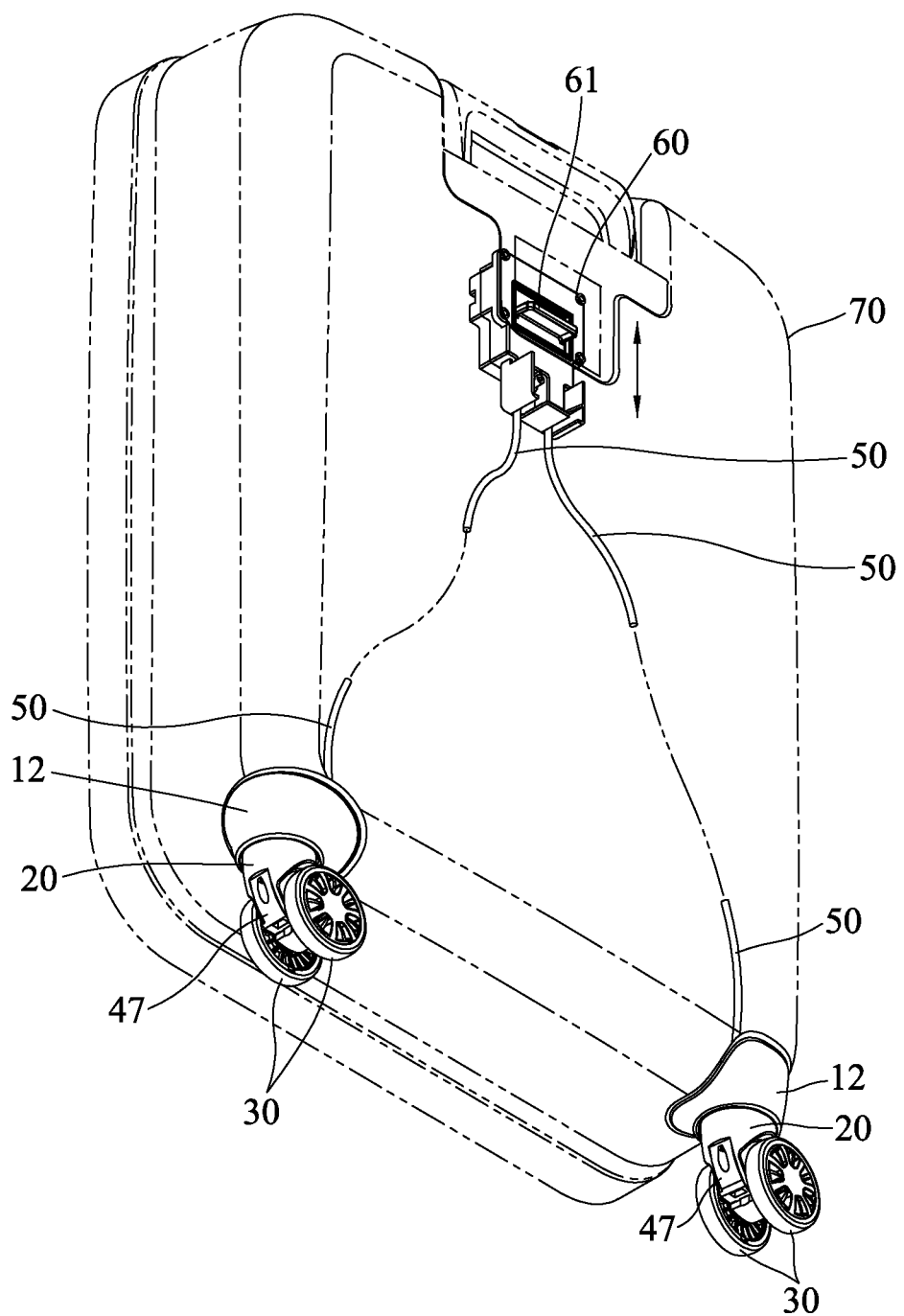
FIG. 1 is a perspective view showing the application of a wheel brake set for a luggage case according to a preferred embodiment of the present invention.
Figure 2:
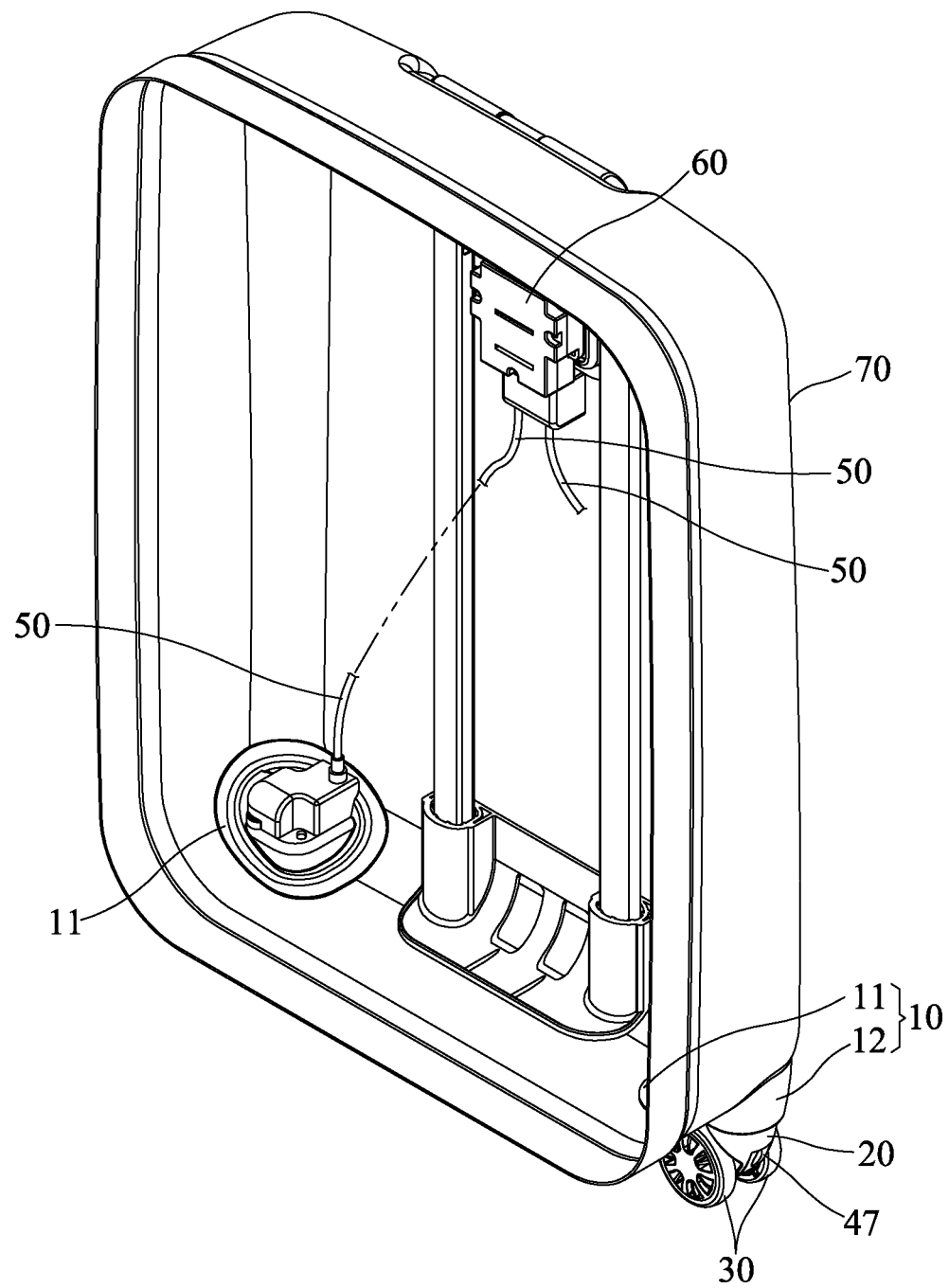
FIG. 2 is another perspective view showing the application of the wheel brake set for the luggage case according to the preferred embodiment of the present invention.
Figure 3:
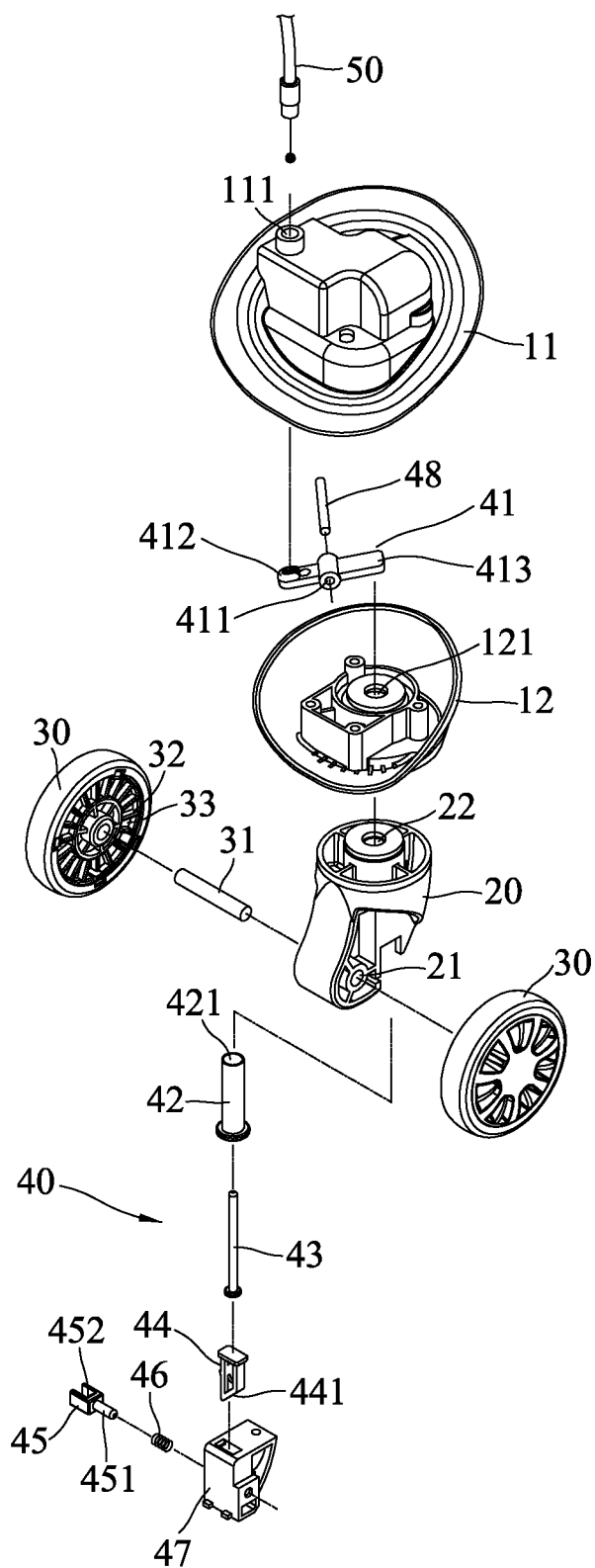
FIG. 3 is a perspective view showing the exploded components of the wheel brake set for the luggage case according to the preferred embodiment of the present invention.

FIG. 1 is a perspective view showing the application of a wheel brake set for a luggage case according to a preferred embodiment of the present invention. FIG. 2 is another perspective view showing the application of the wheel brake set for the luggage case according to the preferred embodiment of the present invention. FIG. 3 is a perspective view showing the exploded components of the wheel brake set for the luggage case according to the preferred embodiment of the present invention. With reference to FIGS. 1-3, the wheel brake set of the present invention comprises: a covering member 10 connected with a luggage case 70, a support assembly 20 disposed below the covering member 10, two wheels 30 mounted on two sides of the support assembly 20, and a driving member 40.

The driving assembly 40 is a mechanical driving component and is coupled with a controller 60 on the luggage case 70 via a pulling rope 50. It is to be noted that the controller 60 is fixed on any one of a top end, a back surface and two side surfaces of the luggage case 70. The controller 60 includes a switch 61 connecting with the pulling rope 50 so as to drive the pulling rope 50, wherein the switch 61 is a push button or a rotary knob.

A first end of the pulling rope is joined with the controller 60, and a second end of the controller 60 is in connection with the driving assembly 40, such that the switch 61 of the controller 60 is switched by a user to drive the pulling rope 50 to pull the driving assembly 40.

Figure 4:
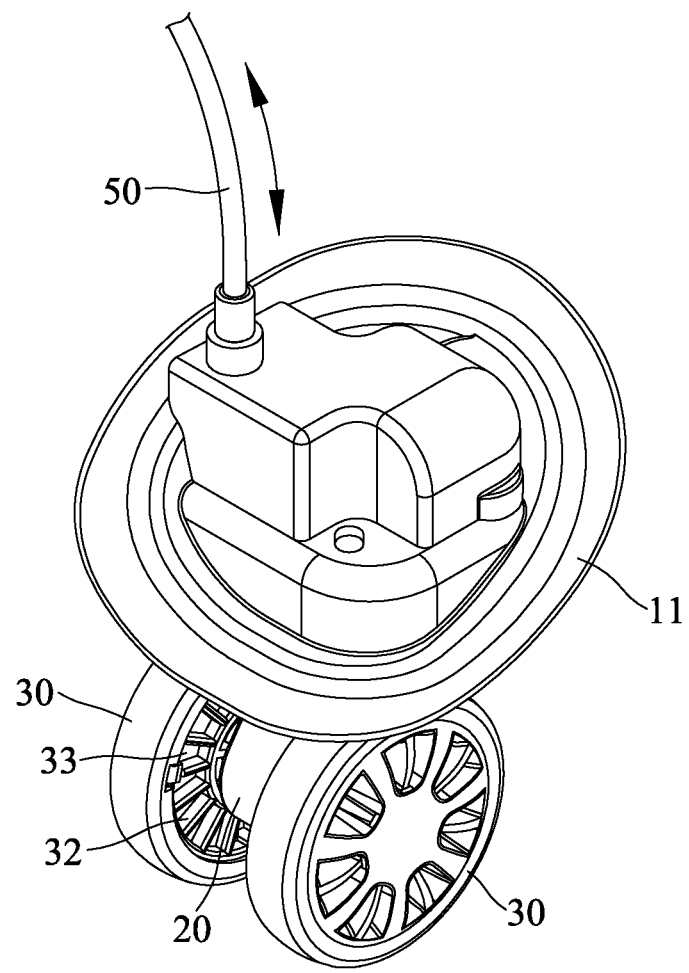
FIG. 4 is a perspective view showing the assembly of the wheel brake set for the luggage case according to the preferred embodiment of the present invention.

FIG. 4 is a perspective view showing the assembly of the wheel brake set for the luggage case according to the preferred embodiment of the present invention. Referring to FIGS. 3 and 4, the covering member 10 includes an upper cover 11 and a lower cover 12 which are arranged inside and outside the luggage case 70; wherein the upper cover 11 has a through pore 111 defined thereon so that the pulling rope 50 is inserted through the through pore 111 to couple with the driving assembly 40.

The support assembly 20 is disposed below the lower cover 12 of the covering member 10 and includes an orifice 21 formed thereon so as to insert a shaft 31, such that the two wheels 30 are mounted on two sides of the shaft 31 so as to support and rotate the support assembly 20.

The driving assembly 40 is provided to position the two wheels 30, for example, the two wheels 30 are interfered by the driving assembly 40 to keep a brake state and will rotate after releasing the driving assembly 40. The driving assembly 40 includes an actuation plate 41, a hollow tube 42, a push bolt 43, a sliding post 44, a fixing pin 45, a resilient element 46, and a frame 47 for accommodating the sliding post 44, the fixing pin 45, and the resilient element 46; wherein the frame 47 is fixed in the support assembly 20.

The actuation plate 41 is disposed in the covering member 10 and is formed in an elongated sheet shape or an elongated bar shape. The actuation plate 41 has an aperture 411 defined on a central position thereof and is mounted in the covering assembly 10 by ways of a rod 48. The actuation plate 41 also has a first extending portion 412 located on a first side of the aperture 411 and a second extending portion 413 located on a second side of the aperture 411, wherein the first extending portion 412 is in connection with the pulling rope 50, and the second extending portion 413 abuts against the push bolt 43.

The hollow tube 42 is inserted through a first opening 121 of the lower cover 12 and a second opening 22 of the support assembly 20 and has a pore 421 for inserting the push bolt 43 which moves relative to the hollow tube 42; wherein an upper end of the push bolt 43 contacts with a lower side of the second extending portion 413, and a lower end of the push bolt 43 abuts against the sliding post 44.

The sliding post 44, the fixing pin 45, and the resilient element 46 are fixed in the frame 47, wherein an upper end of the sliding post 44 is biased against the lower end of the push bolt 43, and a lower end of the sliding post 44 has a first tilted guiding face 441 formed thereon. The sliding post 44 moves vertically in the frame 47, and the fixing pin 45 moves horizontally in the frame 47. The fixing pin 45 has a post segment 451 extending along a first end thereof and a second tilted guiding face 452 defined on a second end thereof and abutting against the first tilted guising face 441. The fixing pin 45 horizontally moves out of the frame 47 to reach a pushing position. The resilient element 46 is secured in the frame 47 and is used to push the fixing pin 45 so that the fixing pin 45 keeps at an original position. In this embodiment, the resilient element 46 is a spring, but it can be also any component for pushing the fixing pin 45.

Figure 5:
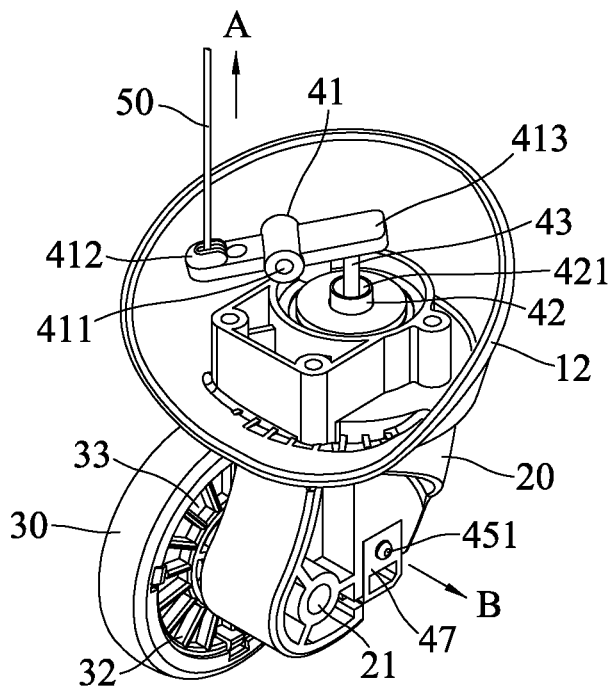
FIG. 5 is a perspective view showing the assembly of a part of the wheel brake set for the luggage case according to the preferred embodiment of the present invention.
Figure 6:
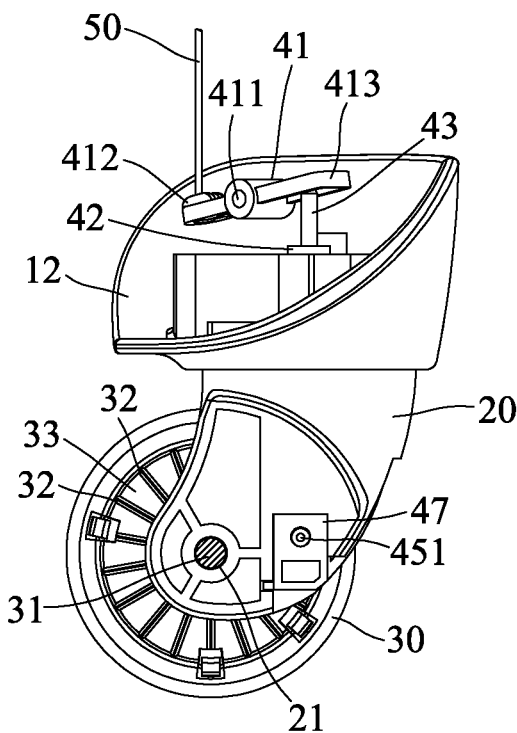
FIG. 6 is a side plan view showing the assembly of a part of the wheel brake set for the luggage case according to the preferred embodiment of the present invention.
Figure 7:
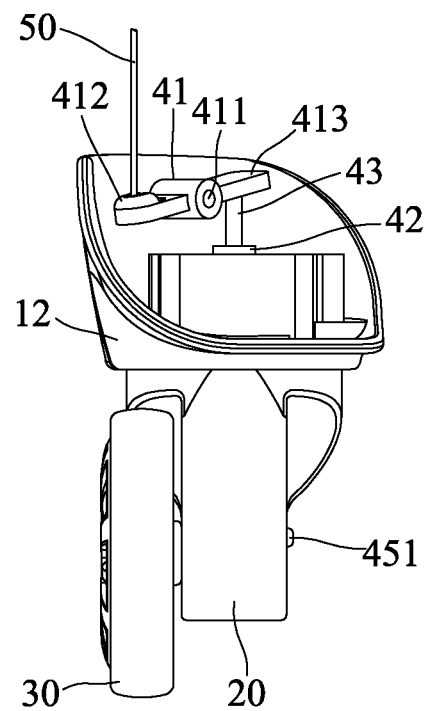
FIG. 7 is a front plan view showing the assembly of a part of the wheel brake set for the luggage case according to the preferred embodiment of the present invention.

FIG. 5 is a perspective view showing the assembly of a part of the wheel brake set for the luggage case according to the preferred embodiment of the present invention. FIG. 6 is a side plan view showing the assembly of a part of the wheel brake set for the luggage case according to the preferred embodiment of the present invention. FIG. 7 is a front plan view showing the assembly of a part of the wheel brake set for the luggage case according to the preferred embodiment of the present invention. As shown in FIGS. 5-7, when the pulling rope 50 is pulled to move along an arrow A, the driving assembly 40 is driven by the pulling rope 50 to pull the fixing pin 45 to move out of the frame 47 and to extend out of a hollowly concave portion (i.e., a hollow hole or a hollow recess) between any two adjacent spokes 32 of a respective one wheel 30 along an arrow B, such that the fixing pin 45 interferes the respective one wheel 30, thus positioning the respective one wheel 30.

Figure 8:
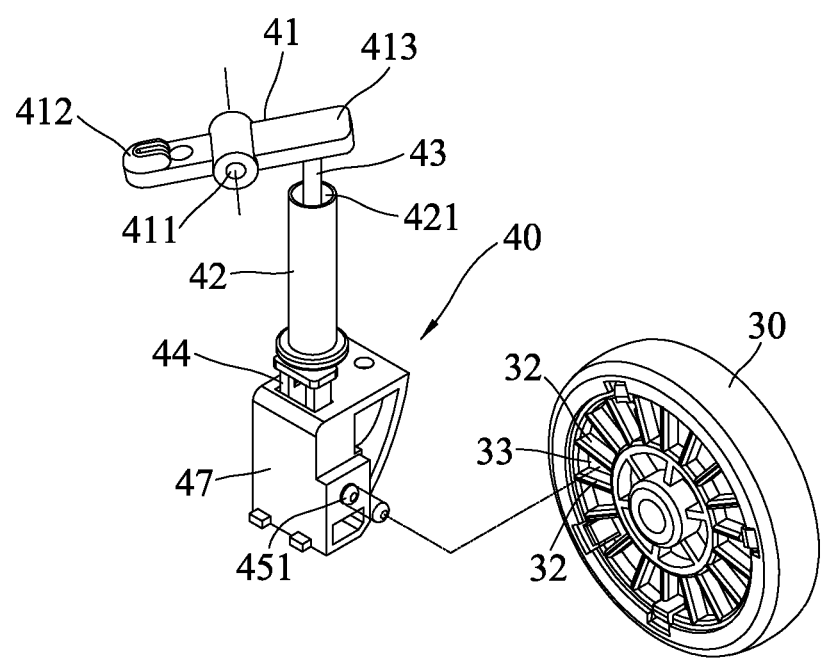
FIG. 8 is a perspective view showing the operation of a driving assembly of the wheel brake set for the luggage case according to the preferred embodiment of the present invention.
Figure 9:
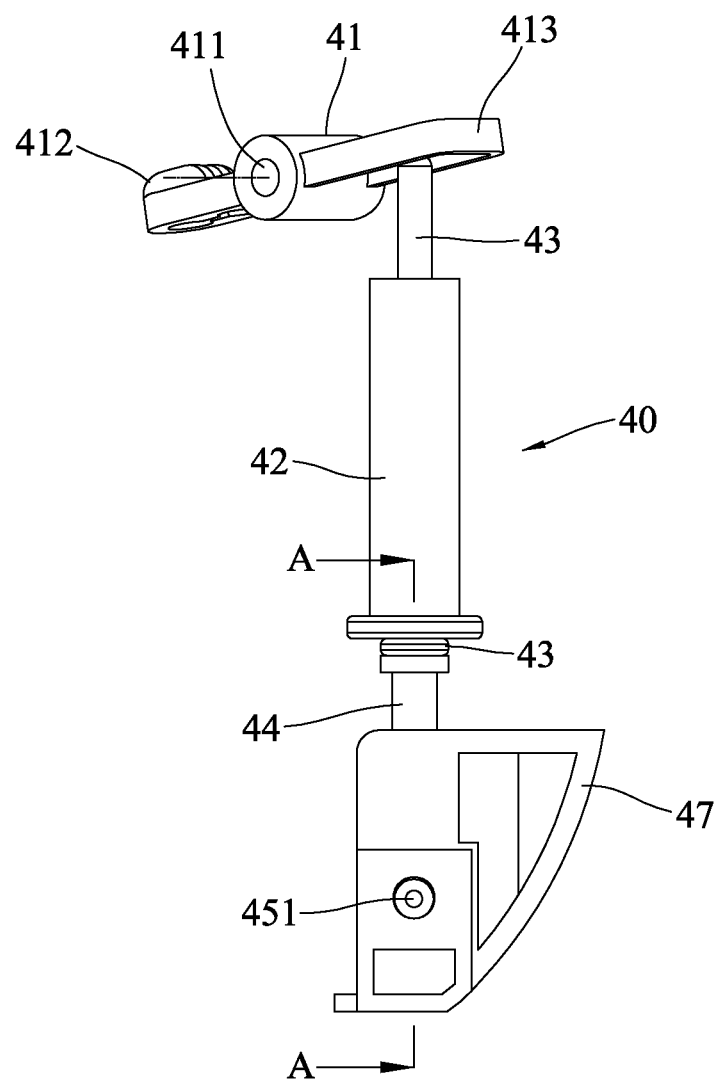
FIG. 9 is a side plan view showing the operation of the driving assembly of the wheel brake set for the luggage case according to the preferred embodiment of the present invention.

FIG. 8 is a perspective view showing the operation of the driving assembly of the wheel brake set for the luggage case according to the preferred embodiment of the present invention. FIG. 9 is a side plan view showing the operation of the driving assembly 40 of the wheel brake set for the luggage case according to the preferred embodiment of the present invention. As illustrated in FIGS. 8 and 9, when the post segment 451 of the of the fixing pin 45 extends out of the frame 47 after being pulled by the pulling rope 45, it inserts into a hollowly concave portion 33 to position the respective one wheel 30. In this embodiment, the driving assembly is served to position the respective one wheel 30. Preferably, the driving assembly 40 can be also applied to position the two wheels 30 simultaneously by means of two fixing pins 45. Also, two driving assemblies 40 can be provided to position the two wheels 30.

Figure 10A:
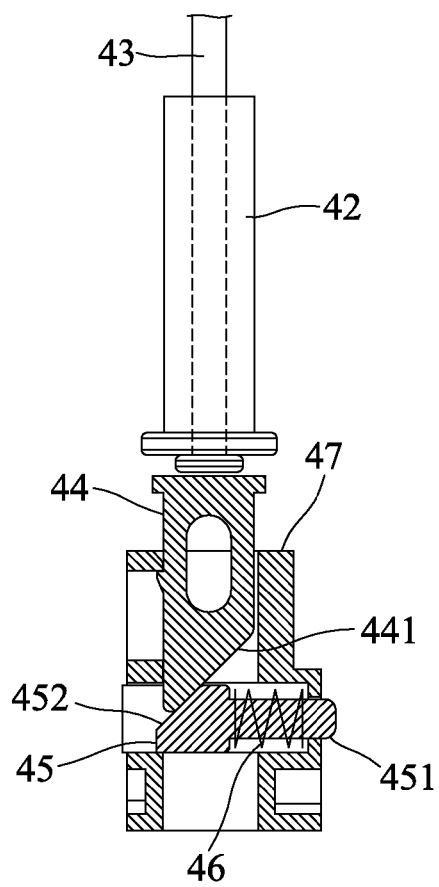
FIG. 10A is a cross sectional view taken along the line A-A of FIG. 9.
Figure 10B:
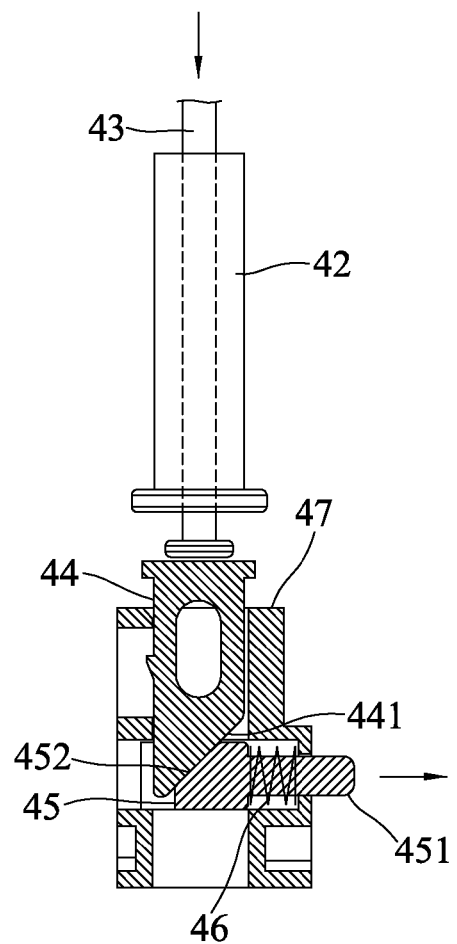
FIG. 10B is another cross sectional view taken along the line B-B of FIG. 9.

FIG. 10A is a cross sectional view taken along the line A-A of FIG. 9. FIG. 10B is another cross sectional view taken along the line B-B of FIG. 9. With reference to FIGS. 9, 10A and 10B, the fixing pin 45 is pushed by the resilient element 46 to fix in an original position as shown in FIG. 10A. After the first extending portion 412 of the actuation plate 41 is pulled upwardly by the pulling rope 50, the second extending portion 413 of the actuation plate 41 presses the push bolt 43 downwardly so that the push bolt 43 pushes the sliding post 44 downwardly, and then the first tilted guiding face 441 of the sliding post 44 pushes the second tilted guiding face 452 of the fixing pin 45 so that the fixing pin 45 forces the resilient element 46 and moves out of the frame 47 to keep at the pushing position (as illustrated in FIG. 10B).

The driving assembly 40 is provided to position and brake the two wheels 30. In other words, the respective one wheel 30 is stopped by the fixing pin 45 of the driving assembly 40. After the fixing pin 45 is released from stopping the respective one wheel 30, the respective one wheel 30 rotates freely to move the luggage case. Thereby, the wheel brake set is simplified and is used to brake the two wheels effectively.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:
1. A wheel brake set for a luggage case comprising:
a covering member;
a support assembly for supporting the covering member;
at least one wheel mounted on one side of the support assembly, and a respective one of the at least one wheel having a plurality of hollowly concave portions defined on one side surface thereof;
a driving assembly including a fixing pin secured on the support assembly for positioning a respective one wheel of the at least one wheel at an original position, wherein the fixing pin is driven to extend out of the support assembly and to insert into a pushing position of one of the plurality of hollowly concave portions, thus positioning the respective one wheel;
wherein the covering member includes an upper cover and a lower cover, wherein the upper cover has a through pore defined thereon so that a pulling rope is inserted through the through pore to couple with the driving assembly;
wherein the driving assembly includes:
an actuation plate disposed in the covering member, the actuation plate has a first extending portion and a second extending portion which are in connection with the pulling rope;
a hollow tube inserted through the lower cover and the support assembly;
a push bolt inserted through the hollow tube and having one end for abutting against the second extending portion;
a sliding post having a first end for abutting against the push bolt and a second end for contacting with the fixing pin; and
a resilient element for pushing the fixing pin to keep at the original position.

2. The wheel brake set for the luggage case as claimed in claim 1, wherein the sliding post has a first tilted guiding face formed thereon, and the fixing pin has a second tilted guiding face thereon and abutting against the first tilted guiding face.

3. The wheel brake set for the luggage case as claimed in claim 1, wherein the sliding post, the fixing pin, and the resilient element are accommodated in a frame.

4. The wheel brake set for the luggage case as claimed in claim 1, wherein the resilient element is a spring.

5. The wheel brake set for the luggage case as claimed in claim 1, wherein the respective one wheel includes the plurality of hollowly concave portions defined on the side surface thereof, and between any two adjacent spokes is defined one of the plurality of hollowly concave portions.

6. The wheel brake set for the luggage case as claimed in claim 1, wherein each hollowly concave portion is a hollow hole or a hollow recess.

7. The wheel brake set for the luggage case as claimed in claim 1, wherein two wheels are mounted on two sides of the support assembly.

8. A wheel brake set for a luggage case being fixed on a bottom end of the luggage case, and a controller being mounted on the luggage case, the wheel brake set comprising:
a covering member connected with the luggage case;
a support assembly for supporting the covering member;
at least one wheel mounted on one side of the support assembly, and a respective one of the at least one wheel having a plurality of hollowly concave portions defined on one side surface thereof;
a driving assembly including a fixing pin secured on the support assembly for positioning a respective one of the at least one wheel at an original position, wherein the fixing pin is driven to extend out of the support assembly and to insert into a pushing position of one of the plurality of hollowly concave portions, thus positioning the respective one wheel;
wherein the controller is in connection with the driving assembly through a pulling rope so as to switch the fixing pin to move;
wherein the covering member includes an upper cover and a lower cover, wherein the upper cover has a through pore defined thereon so that the pulling rope is inserted through the through pore to couple with the driving assembly;
wherein the driving assembly includes:
an actuation plate disposed in the covering member, the actuation plate has a first extending portion and a second extending portion which are in connection with the pulling rope;
a hollow tube inserted through the lower cover and the support assembly;
a push bolt inserted through the hollow tube and having one end for abutting against the second extending portion;
a sliding post having a first end for abutting against the push bolt and a second end for contacting with the fixing pin; and
a resilient element for pushing the fixing pin to keep at the original position.

9. The wheel brake set for the luggage case as claimed in claim 8, wherein the sliding post has a first tilted guiding face formed thereon, and the fixing pin has a second tilted guiding face thereon and abutting against the first tilted guiding face.

10. The wheel brake set for the luggage case as claimed in claim 8, wherein the sliding post, the fixing pin, and the resilient element are accommodated in a frame.

11. The wheel brake set for the luggage case as claimed in claim 8, wherein the resilient element is a spring.

12. The wheel brake set for the luggage case as claimed in claim 8, wherein the respective one wheel includes the plurality of hollowly concave portions defined on the side surface thereof, and between any two adjacent spokes is defined one of the plurality of hollowly concave portions.

13. The wheel brake set for the luggage case as claimed in claim 8, wherein each hollowly concave portion is a hollow hole or a hollow recess.

14. The wheel brake set for the luggage case as claimed in claim 8, wherein two wheels are mounted on two sides of the support assembly.

15. The wheel brake set for the luggage case as claimed in claim 8, wherein the controller includes a switch connecting with the pulling rope so as to drive the pulling rope.

16. The wheel brake set for the luggage case as claimed in claim 8, wherein the switch is a push button or a rotary knob.

\* \* \* \* \*